United States Patent [19]

Altmann et al.

[11] Patent Number: 5,415,714

[45] Date of Patent: May 16, 1995

[54] METHOD FOR POSITIONALLY SECURING TWO DIFFERENT COMPONENTS TOGETHER

[75] Inventors: Michael Altmann, Loechgau; Dieter Dick, Muehlacker; Manfred Franz, Ditzingen; Albert Gerhard, Tamm; Uwe Hammer, Schwieberdingen; Johannes Meiwes, Markgroeningen; Friedrich Wendel, Weissach; Wolfgang Staudenmaier, Weinstadt; Frank Frankenhauser, Beilstein; Gerhard Kirschner, Marbach; Egon Waldvogel, Leonberg; Rolf Bald, Bad Wimpfen; Arno Altpeter, Sindelfingen, all of Germany

[73] Assignee: Robert Bosch GmbH, Stuttgart, Germany

[21] Appl. No.: 63,810

[22] Filed: May 20, 1993

[30] Foreign Application Priority Data

Aug. 22, 1992 [DE] Germany .................... 42 27 850.3

[51] Int. Cl.⁶ ............................................. B32B 31/16
[52] U.S. Cl. ................... 156/73.1; 156/580.1; 227/66
[58] Field of Search ............... 156/73.1, 580.1, 580.2, 156/69, 91, 92; 264/23; 227/66, 156; 29/522.1

[56] References Cited

U.S. PATENT DOCUMENTS

| | | | |
|---|---|---|---|
| 3,184,353 | 5/1965 | Balamuth et al. | 156/92 X |
| 3,438,824 | 4/1969 | Balamuth | 156/580.2 X |
| 3,998,824 | 12/1976 | Otsuki et al. | 264/249 |
| 4,312,077 | 1/1982 | Petersson | 156/92 X |
| 4,647,325 | 3/1987 | Bach | 156/73.1 |
| 4,767,478 | 8/1988 | Christine | 156/69 |
| 5,147,482 | 9/1992 | Miyabayashi | 156/73.1 |

FOREIGN PATENT DOCUMENTS

| | | | |
|---|---|---|---|
| 2054836 | 7/1972 | Germany . | |
| 1225628 | 3/1971 | United Kingdom | 285/21 |

OTHER PUBLICATIONS

Hütte, Des Ingenieurs Taschenbuch, 1954, IIA, 28th Edition, p. 47.

Primary Examiner—David A. Simmons
Assistant Examiner—J. Sells
Attorney, Agent, or Firm—Edwin E. Greigg; Ronald E. Greigg

[57] ABSTRACT

A method for positionally securing two components together, in which a hollow body is introduced into the two components. Once the final position of the components relative to one another has been established, the hollow body is driven directly into the second component with the application of axial pressure and sonic energy. The method is suitable for employment with thermoplastic components whose relative position to one another is known beforehand, an example being in the assembly of housing parts of a rotary adjuster for controlling a flow cross section in internal combustion engines.

2 Claims, 2 Drawing Sheets

METHOD FOR POSITIONALLY SECURING TWO DIFFERENT COMPONENTS TOGETHER

BACKGROUND OF THE INVENTION

The invention is based on a method for positional securing, or for component position securing, between at least two components relative to one another as defined hereinafter. A method and component position securing are known in which the positional securing of components is effected by introducing at least one pin of cylindrical or conical shape, and in particular a hollow pin, into a bore formed in each of the components for that purpose (Hütte [Smelter] II A, 28th Edition, page 41), in which the outer diameter of the pin and the inner diameters of the correlating bores are fixed in such a way that surface pressure is created between the pin and at least one bore. A disadvantageous feature of this method is that at least one of the two bores cannot be made until after the final relative position of the components has been set; particularly at the high quantities involved in mass production, this involves major production expense.

OBJECT AND SUMMARY OF THE INVENTION

The method for positionally securing components and the component position securing as defined hereinafter have an advantage over the prior art that the expensive step of drilling that follows the setting of the relative position of the components is dispensed with, so that the relative position of the components to one another can be secured in a simple manner.

It is especially advantageous to provide a taper in the region of the end of the hollow body that penetrates the component; this lessens vibrational energy and axial force required for driving the hollow body into the component.

In a further advantageous feature, both of the components to be joined are made from thermoplastic, which makes it possible for a hollow body that by the method connects the components to be driven both directly into the wall of a first component to be joined and into the wall of at least a second component to be joined.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
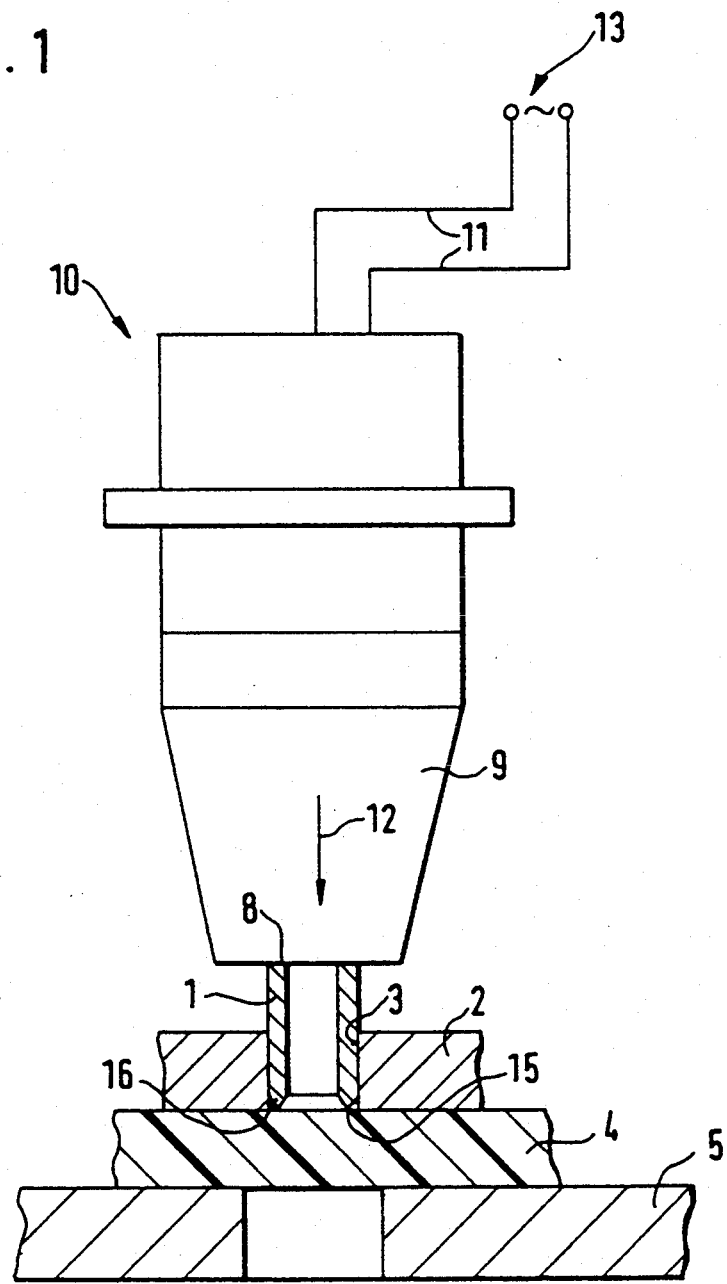
FIG. 1 is a side view showing the basic outline of a method according to the invention for positionally securing components.

In FIG. 1, a hollow body of metal is identified by reference numeral 1; it protrudes partway into a continuous bore 3 disposed in a first component 2, into which bore it is introduced in a first method step. The bore 3 advantageously has an inside diameter that is somewhat smaller than the outside diameter of the hollow body 1, as a result of which after being inserted into the bore 3, the hollow body is fixed by a radial pressure.

The hollow body 1 may have an arbitrary outer shape. Advantageously, the hollow body 1 is formed cylindrically or as a conical surface and has a through bore that is correspondingly in the form of a conical surface. A continuous slit extending in the axial direction may be disposed on the circumference of the hollow body 1; as a result, the hollow body 1, if its outside diameter is adapted to the inside diameter of the bore 3, is advantageously braced in the bore 3 after being introduced into it.

The first component 2 comprises an arbitrary solid material, such as metal or plastic, and is disposed resting parallel to a second component 4 of thermoplastic, which is supported on the other side against a brace 5. The components 2, 4 may also be portions of different bodies, the portions being straps, flanges, or the like.

A sonotrode 9 of a known ultrasound source 10, for instance a commercially available ultrasonic welding unit, in an axially aligned way engages the free end 8 of the hollow body 1 protruding from the bore 3. The ultrasound source 10 is connected to a voltage source 13 via connecting lines 11 and in a known manner generates mechanical vibration in the range from 20 to 50 kHz in the axial direction. A high proportion of the vibrational energy of the ultrasound source 10 is transmitted to the hollow body 1 via the sonotrode 9 and is carried by the hollow body into its end 15 to be driven in, which is opposite the free end 8. Once the components 2, 4 have been put into a desired relative position, then by means of an axial force acting in the direction of the arrow 12, the hollow body 1 is introduced until it contacts the second component 4 and is then driven into the second component 4; the component 4, which is made of thermoplastic, is heated up to the melting point, and the molten plastic in the interior of the hollow body 1 can deflect away from the direction of introduction.

The molten plastic partly fills the interior of the hollow body 1, thereby bracing the hollow body 1 in the radial direction against the first component 2 and the second component 4. If there is an axial slit in the hollow body 1, then a residual cohesion between the component 4 and the plastic located in the interior of the hollow body 1 remains in effect, which additionally reinforces the strength of the component positional securing according to the invention.

Both the vibrational energy necessary for driving the hollow body 1 and the requisite axial force can be reduced by reducing the size of the contact area between the hollow body 1 and the second component 4. To that end, the hollow body 1 has at least one taper 16, on its end 15 that is driven in and penetrates the second component 4, and this taper is formed by way of example by one or two chamfers or bevels on the periphery of the hollow body 1.

If only a slight axial force is required for driving in the hollow body 1, then the brace 5 may be omitted. The same is correspondingly true if the second component 4 is rigidly embodied.

In a further advantageous method, both the first component 2 and the second component 4 are of thermoplastic, so that by means of an ultrasound source 10 and an axial force acting in the direction of the arrow 12 the hollow body 1 can be driven directly into both components 2, 4, without requiring the prior drilling of a bore in the second component 2. Moreover, it is conceivable for the hollow body 1 to be driven into not only the second component 4 but also other components of thermoplastic, and for the position of more than two components relative to one another to be secured thereby.

Figure 2:
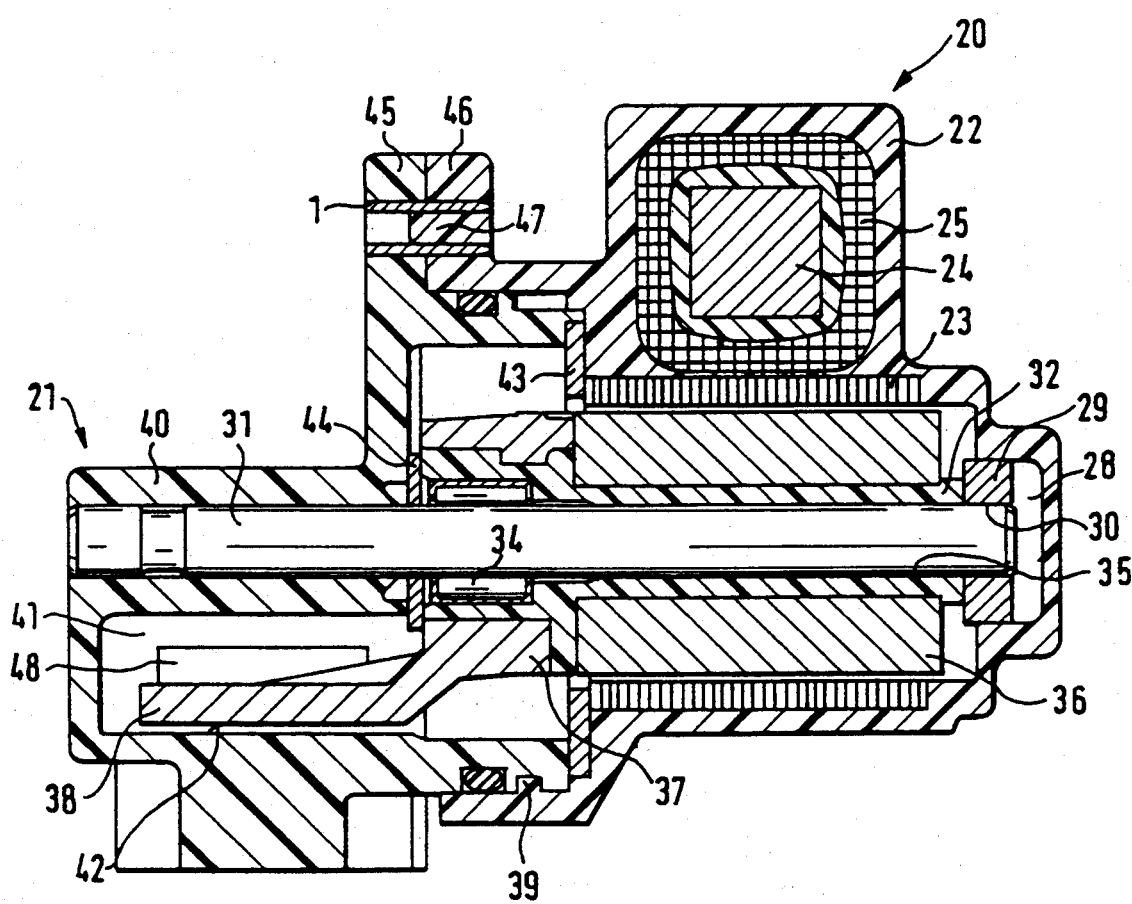
FIG. 2 is a longitudinal section through a rotary adjuster for governing the idling speed, having two housing parts whose position relative to one another is secured according to the invention.

FIG. 2 shows a known rotary adjuster for controlling a flow cross section in internal combustion engines, which is composed of a driving part 20 and an adjuster part 21. The driving part 20 has a drive housing 22 of thermoplastic, which encloses a stator 23, made up for instance of sheet-metal laminations, and a winding 25 disposed around an induction core 24. A hollow body 29 is seated in an indentation 28 of the drive housing 22 and has a bore 30, into which one end of a shaft 31 is press-fitted. A carrier body 32 is rotatably supported, for instance via a roller bearing 34 and a sliding seat 35, on the shaft 31, which is fixed on its other end in an adjuster housing 40 of the adjuster part 21, for instance by extrusion coating. The carrier body 32 is partly surrounded on its circumference by a permanent magnet 36 and a control member 37, and a control arm 38 is formed on the control member 37. The control arm 38 protrudes into an adjuster chamber 41 formed by the adjuster housing 40 and has an outer face 42 that is shaped such that it is as accurately as possible equivalent to the inside diameter of an adjusting window 48 of a flow opening, not shown in further detail, that discharges into the adjuster chamber 41, and uncovers the flow opening to a variable extent depending on the rotary angle of the position of the control arm 38. The drive housing 22 of the driving part 20 and the adjuster housing 40 of the adjuster part 21 are formed-fittingly joined in the axial direction via a bayonet mount 39 and are braced without play, with the aid of a wave washer 43. A washer 44 disposed on the shaft 11 between the adjuster housing 40 and the carrier body 32 assures low-friction rotatability of the carrier body 32.

In the rotary adjuster shown in FIG. 2, for controlling a flow cross section in internal combustion engines, the rotary angle position of the control arm 38 is determined by the position of a magnetic field formed diametrically in the permanent magnet 36, and by the properties of the magnetic field induced in the stator 23 by means of an exciter current; a specific rotary angle position of the control arm 38 corresponds to each excitation state. After the installation of the rotary adjuster, in order to assure that this rotary angle position will correspond to a desired closing state of the flow cross section, a specific basic position is established by rotating the adjusting window 48, formed in the adjuster chamber 41, relative to the control arm 38. To that end, the adjuster housing 40, joined to the drive housing 22 via the bayonet mount 39, is rotated in the circumferential direction relative to the drive housing 22 until the outer face 42 of the control arm 38 uncovers a desired flow cross section of the adjusting window 48.

Since the bayonet mount 39 offers no security against torsion, the position between the drive housing 22 and the adjuster housing 40 is secured by the introduction, according to the invention, of the hollow body 1 as described in conjunction with FIG. 1. The adjuster housing 40 then corresponds to the first component 2 and the drive housing 22 correspond to the second component 4 of FIG. 1, and the positional securing of components takes place between a strap 45 of the adjuster housing 40 and a strap 46 of the drive housing 22. To that end, in the manner described above, the hollow body 1 is mounted on the strap 45 of the adjuster housing 40 and is driven into the straps 45 and 46 by means of the sonotrode 9 shown in FIG. 1. Because of the penetration of the hollow body 1 into the second component strap 46, the second component 4 or strap 46 exhibits a plastic deformation in the region positively displaced by the hollow body 1.

The plastic melted upon penetration of the hollow body 1 into the second component 4 strap 46 is partly positively displaced counter to the direction of penetration of the hollow body 1 and fills the interior of the hollow body 1 in such a way that a surface pressure is created between the second component strap 46 and this surface pressure fixes the hollow body 1 in the strap 46. This surface pressure is sufficient to make small axial forces transferrable between the components 45 and 46. For greater axial forces, additional fixation is necessary, for example by means of the bayonet mount 39. The components 45, 46 are fixed via the hollow body 1 in the tangential direction.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method of position securing between a first housing part having an axially extending continuous slit and at least one second housing part of a rotary adjuster having a driving part (20) and a control member (37) for controlling a flow cross section in internal combustion engines, which comprises forming at least one aperture in said first housing part, forcing at least one hollow body of metal through said at least one aperture in said first housing part and into at least a portion of said second housing part by means of an application of axial pressure and ultrasonic energy, and at least the second housing part (4, 22) exhibits a plastic deformation (47) in an interior of the hollow body (1).

2. A method of position securing as defined by claim 5, in which the hollow body has a taper (16) on one end (15) to be driven into said second housing part, which end penetrates the second housing part (4, 22).

* * * * *